United States Patent
Maestrini et al.

(10) Patent No.: US 10,119,583 B2
(45) Date of Patent: Nov. 6, 2018

(54) FRICTION ASSEMBLY, BRAKE CALLIPER AND MANUFACTURING METHOD

(71) Applicant: FRENI BREMBO S.P.A., Curno, Bergamo (IT)

(72) Inventors: Luca Maestrini, Bergamo (IT); Laura Sammarelli, Bergamo (IT); Paolo Varotto, Bergamo (IT)

(73) Assignee: FRENI BREMBO S.P.A., Curno, Bergamo (IT)

( * ) Notice: Subject to any disclaimer, the term of this patent is extended or adjusted under 35 U.S.C. 154(b) by 24 days.

(21) Appl. No.: 15/311,542

(22) PCT Filed: May 14, 2015

(86) PCT No.: PCT/IB2015/053564
§ 371 (c)(1),
(2) Date: Nov. 16, 2016

(87) PCT Pub. No.: WO2015/173768
PCT Pub. Date: Nov. 19, 2015

(65) Prior Publication Data
US 2017/0138424 A1 May 18, 2017

(30) Foreign Application Priority Data

May 16, 2014 (IT) .............. BG2014A0015

(51) Int. Cl.
| | |
|---|---|
| F16D 69/00 | (2006.01) |
| F16D 65/095 | (2006.01) |
| F16D 66/02 | (2006.01) |
| F16D 65/00 | (2006.01) |
| F16D 65/097 | (2006.01) |
| F16D 69/02 | (2006.01) |
| F16D 66/00 | (2006.01) |
| F16D 69/04 | (2006.01) |

(52) U.S. Cl.
CPC ....... *F16D 65/095* (2013.01); *F16D 65/0018* (2013.01); *F16D 65/0971* (2013.01);
(Continued)

(58) Field of Classification Search
CPC ...... F16D 65/092; F16D 66/02; F16D 66/024; F16D 69/026
(Continued)

(56) References Cited

U.S. PATENT DOCUMENTS 4,022,302 A * 5/1977 Janssen ............... F16D 65/0006
188/73.1
4,037,689 A * 7/1977 Maehara ............ F16D 65/0972
188/1.11 R
(Continued)

FOREIGN PATENT DOCUMENTS

| EP | 0943832 A2 | 9/1999 |
|---|---|---|
| FR | 2110927 A5 | 6/1972 |
| GB | 2003088 A | 3/1979 |

OTHER PUBLICATIONS

Search Report for IT BG2014A000015 dated Feb. 5, 2015.
International Search Report for PCT/IB2015/053564 dated Oct. 30, 2015.

*Primary Examiner* — Christopher P Schwartz
(74) *Attorney, Agent, or Firm* — Thomas Horstemeyer, LLP

(57) ABSTRACT

Friction assembly (1) comprising a support plate (2) and at least one brake pad (4), made by co-molding of at least one heat-resistant resin, the heat-resistant resin of the support plate (2) being partially loaded with non-metallic reinforcement fibers. The support plate (2) identifies one or more accessory-connection seat, made by co-molding. This invention further relates to a method for the manufacture of a friction assembly and a brake calliper.

20 Claims, 10 Drawing Sheets

(52) U.S. Cl.
 CPC ......... *F16D 66/021* (2013.01); *F16D 69/026*
  (2013.01); *F16D 2066/001* (2013.01); *F16D*
  *2066/005* (2013.01); *F16D 2069/001*
  (2013.01); *F16D 2069/0491* (2013.01); *F16D*
  *2200/0047* (2013.01); *F16D 2200/0052*
  (2013.01); *F16D 2200/0069* (2013.01); *F16D*
  *2200/0086* (2013.01)

(58) Field of Classification Search
 USPC ............... 188/1.11 E, 1.11 L, 1.11 R, 1.11 W,
  188/250 B, 251 A, 251 M; 428/283, 290;
  523/153, 156
 See application file for complete search history.

(56) References Cited

U.S. PATENT DOCUMENTS

| | | | | |
|---|---|---|---|---|
| 4,146,527 A | * | 3/1979 | Yamamoto | C08K 3/04 523/158 |
| 4,498,559 A | * | 2/1985 | Katagiri | F16D 66/02 116/208 |
| 5,117,947 A | * | 6/1992 | Kobayashi | F16D 66/02 116/208 |
| 5,377,792 A | * | 1/1995 | Idesawa | F16D 65/092 188/251 R |
| 5,453,317 A | * | 9/1995 | Yesnik | C08J 5/04 442/104 |
| 5,509,508 A | * | 4/1996 | Evans | F16D 65/0006 188/73.31 |
| 5,706,917 A | * | 1/1998 | Matsuzaki | F16D 65/0977 188/250 D |
| 5,984,055 A | * | 11/1999 | Strasser | F16D 69/023 188/251 A |
| 6,116,384 A | * | 9/2000 | Matsumoto | F16D 65/0006 188/250 D |
| 6,260,674 B1 | * | 7/2001 | Arai | F16D 69/04 188/251 A |
| 6,267,206 B1 | | 7/2001 | Grimme et al. | |
| 2010/0065389 A1 | * | 3/2010 | Gilboy | F16D 65/092 188/251 R |
| 2011/0198170 A1 | | 8/2011 | Turani et al. | |
| 2012/0160616 A1 | | 6/2012 | Passalacqua et al. | |
| 2017/0175838 A1 | * | 6/2017 | Muffley | F16D 65/092 |

* cited by examiner

FRICTION ASSEMBLY, BRAKE CALLIPER AND MANUFACTURING METHOD

CROSS-REFERENCE TO RELATED APPLICATIONS

This application is the 35 U.S.C. § 371 national stage application of PCT Application No. PCT/162015/053564, filed May 14, 2015, where the PCT claims priority to and the benefit of, IT Patent Application No. BG2014A000015, filed May 16, 2014, both of which are herein incorporated by reference in their entirety.

BACKGROUND

It is known that the friction elements of brake, callipers for disc brakes are supported by a plate or intermediate body: the forces necessary for braking are transmitted from the calliper to the intermediate body by means of one or more movable pistons, so that the intermediate body pushes the friction element in abutment of said disc, slowing its rotation around the related axis.

The friction element and the intermediate body are traditionally manufactured from different materials, subsequently connected and made integral.

More precisely, in order to ensure long-term reliability of the brake calliper, the intermediate body is often made of metal (for example iron or steel), as this further ensures high performance.

However, the use of traditional materials implies a considerable overall weight of the whole friction element-intermediate body assembly and, therefore, of each calliper. From the point of view of the most efficient use of fossil fuels, a reduction in weight of the above components would be very desirable.

BRIEF SUMMARY OF THE INVENTION

This invention relates to a friction assembly, a method for the manufacture of a friction assembly and a brake calliper mounting one such assembly.

This invention should be viewed in the context of the background, proposing to provide a friction assembly of drastically lower weight compared to the components of the prior art, but of at least comparable reliability compared to the systems currently used.

This objective is achieved by means of a friction assembly, by means of a brake calliper, and by means of a method of making a friction assembly. The claims dependent on these show variants of preferred embodiments.

BRIEF DESCRIPTION OF THE DRAWINGS

The object of this invention will now be described in detail, with the help of the attached figures, wherein.

DETAILED DESCRIPTION

Figure 1:
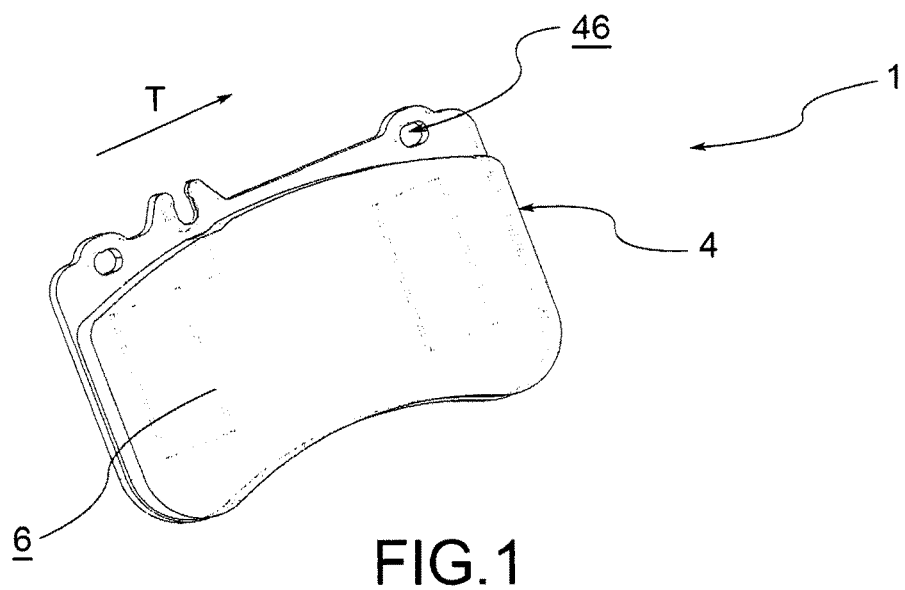
FIGS. 1, 2 and 3 respectively show a front perspective view, a front view and a sectional view along the plane of FIG. 2 of a friction assembly, covered by this invention, according to an embodiment FIGS. 4, 5 and 6 respectively show a rear perspective view, a front view and a sectional view along the plane VI-VI of FIG. 5 of a friction assembly, covered by this invention, according to another embodiment.

With reference to the above figures, reference number 1 identifies, in its totality, a friction assembly comprising a support plate 2 and at least one brake pad 4, made by co-moulding (preferably hot) of at least one heat-resistant resin.

Preferably, the heat-resistant resin is a thermosetting resin.

Advantageously, the heat-resistant resin is a phenolic resin such as a novolac.

Preferably, the heat-resistant (or phenolic) resin is the same for the support plate 2 and for the brake pad 4.

According to an embodiment, the support plate 2 and the brake pad 4 are made from different heat-resistant resins, for example belonging to the same family of polymers.

According to a variant, the phenolic resin comprises or consists of CAS resin No. 9003-35-4.

According to a further variant, the resin is heat-resistant at least up to the operating temperature of the assembly 1.

According to a still further variant, the phenolic resin is obtained through a reaction between phenol optionally substituted and formaldehyde in the presence of hexamethylenetetramine.

In other words, according to this variant, the phenolic resin/novolac, which is advantageously a thermoplastic resin, reacts with the hexamethylenetetramine in the role of cross-linker to become a thermosetting resin.

For example, the hexamethylenetetramine may be present in a percentage ranging between 5% and 10% with respect to the weight of the heat-resistant resin, or the total weight of the resin loaded with the reinforcing fibres.

In the embodiments shown, the support plate 2 delimits a substantially planar rear surface 28. Advantageously, the rear surface 28 is configured to act as an abutment for at least one movement piston (for example, internally hollow) of the brake calliper. Advantageously, the support plate 2 may have a generally rectangular layout.

For example, in the presence of an internally hollow movement piston, the friction assembly 1 could be provided at the rear—in correspondence of the plate—with at least one anchor component 24 insertable in the compartment of the piston so as to make the support plate integral with the piston at least in a phase of movement of the brake pad away from the respective disc.

In this way, the brake pad is prevented from remaining in contact with the disc after an activation of the brake calliper is released and, therefore, after the slowing of the rotation of the disc is finished.

In the embodiment shown in the figures, the anchor component 24 comprises one or more resilient tongues 50, configured to snap-lock in the hollow piston.

Preferably, at least one resilient tongue 50 could be curved radially outwardly to engage an undercut delimited by the piston, with respect to an axis of movement of the latter.

According to an embodiment, the support plate 2 identifies, through its thickness, one or more holes 46 adapted to engage, in a translatable manner, guides (not shown) of the brake calliper, in particular when moving towards/away from a corresponding disc to be braked.

According to a further embodiment, the support plate 2 may comprise a reinforcement mesh or plate, at least partially inserted in its thickness to create a substantial planarity of the rear surface 28 of said plate.

According to a still further embodiment, at least the rear surface 28 of the support plate 2 could be subjected to grinding, so as to facilitate a substantial planarity.

The phenolic resin of the support plate 2 is partially loaded with reinforcing fibres, preferably non-metallic. Purely by way of example, the reinforcement fibres usable could include carbon fibres, glass fibres, boron fibres, silica fibres, silicon carbide fibres, ceramic fibres and mixtures thereof.

The glass fibres represent a particularly preferred embodiment of this invention.

For example the ratio between the weight of the heat-resistant resin and the weight of the reinforcement fibres could be between 0.1 and 3.0, advantageously between 0.3 and 2.0, optionally between 0.4 and 1.8, for example, between 0.7 and 1.5.

Preferably, the reinforcing fibres are of an average length equal to, or greater than, about 12 millimeters (for example equal to, or greater than, a 13 or 14 millimeters) to increase the mechanical strength of the support plate 2, at least with respect to a plate made of heat resistant resin devoid of the above-mentioned fibres.

According to an advantageous embodiment, the reinforcement fibres are oriented prevalently or exclusively along a transversal stress direction T of said brake pad 4, in a configuration of correct use of said assembly 1 in a disc brake calliper.

According to a further variant, the brake pad 4 is, on the contrary, devoid of reinforcement fibres.

However, a preferred embodiment provides that the heat-resistant resin of the brake pad 4 comprises at least one friction modifying component.

Purely by way of example, the friction modifying component could be selected from a metal powder (for example copper, iron, aluminium and/or zinc), an oxide of aluminium or silicon, a flaky material (such as graphite or mica), or combinations thereof.

For variants that contemplate the presence of the friction modifying component, the percentage by weight of this could be related to the percentage by weight of the reinforcement fibres in the support plate, so as to match the thermal shrinkage and/or expansion of the support plate 2 and of the brake pad 4.

According to an embodiment, the friction modifying component could also be present in the heat-resistant resin of the support plate 2, at least at the separation zone 26 with the brake pad 4.

Figure 3:
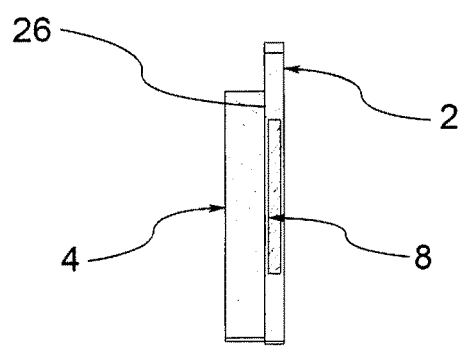
Figure 4:
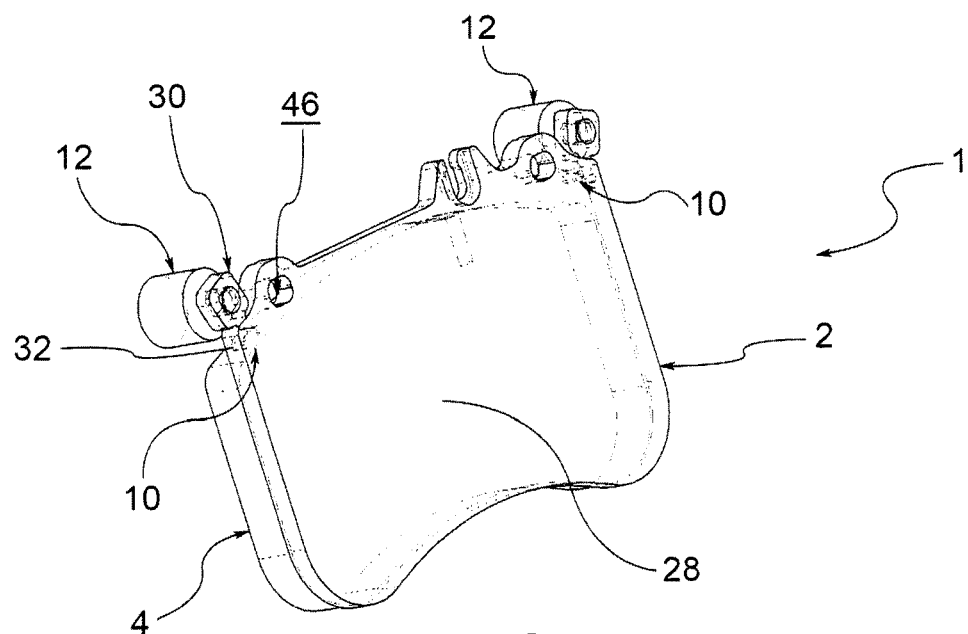
Figure 12:
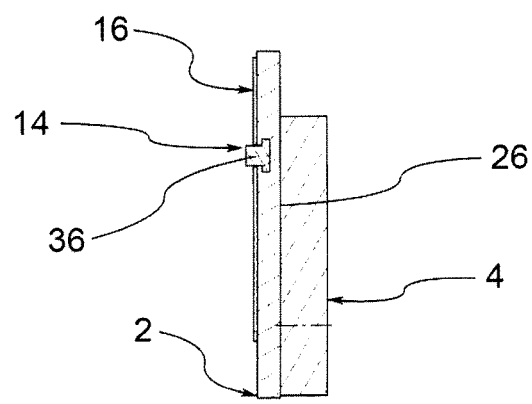
Figure 14:
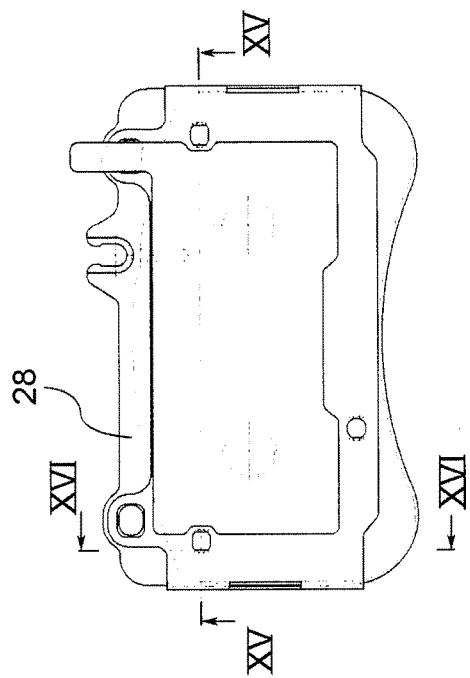
FIGS. 13, 14, 15 and 16 respectively illustrate a rear perspective view, a rear view and two sectional views along the plane XV-XV of FIG. 14 of a friction assembly, covered by this invention, according to a further variant.
Figure 16:
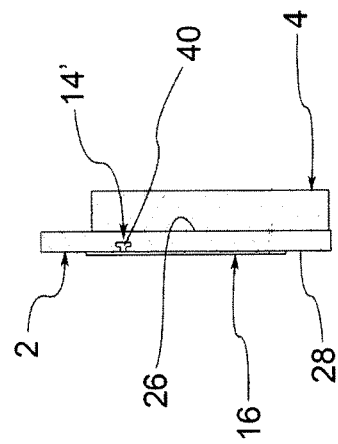
Figure 13:
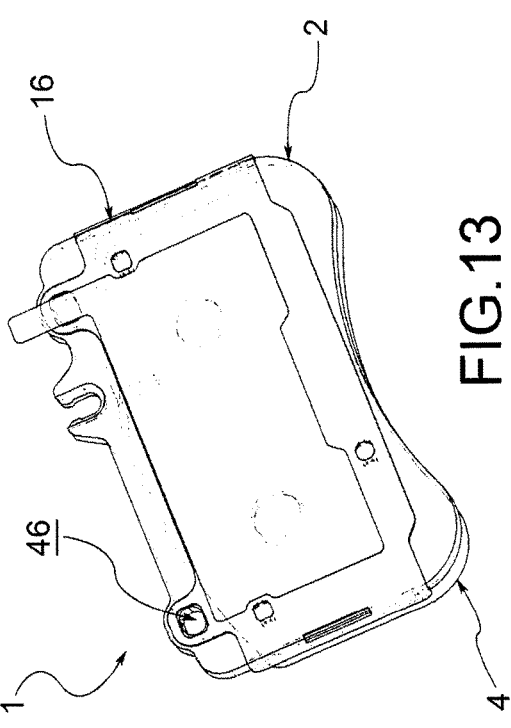
Figure 15:
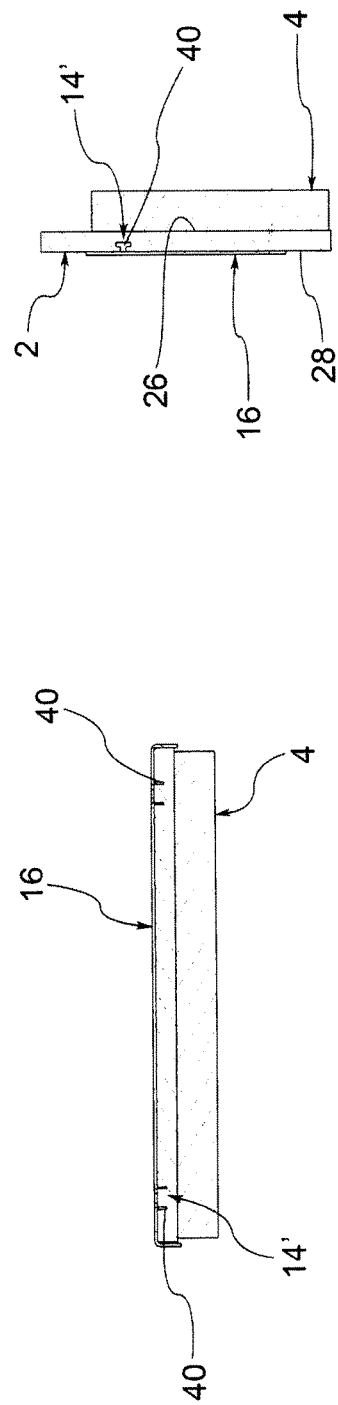
Figure 17:
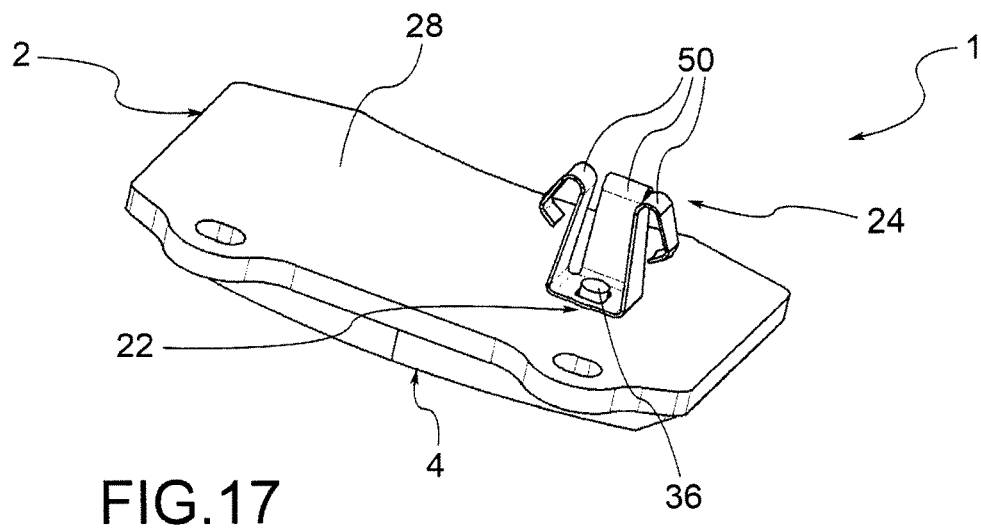
FIGS. 17, 18 and 19 respectively show a rear perspective view, a rear view and a sectional view along the plane XIX-XIX of FIG. 18 of a friction assembly, covered by this invention, according to a still further variant.
Figure 18:
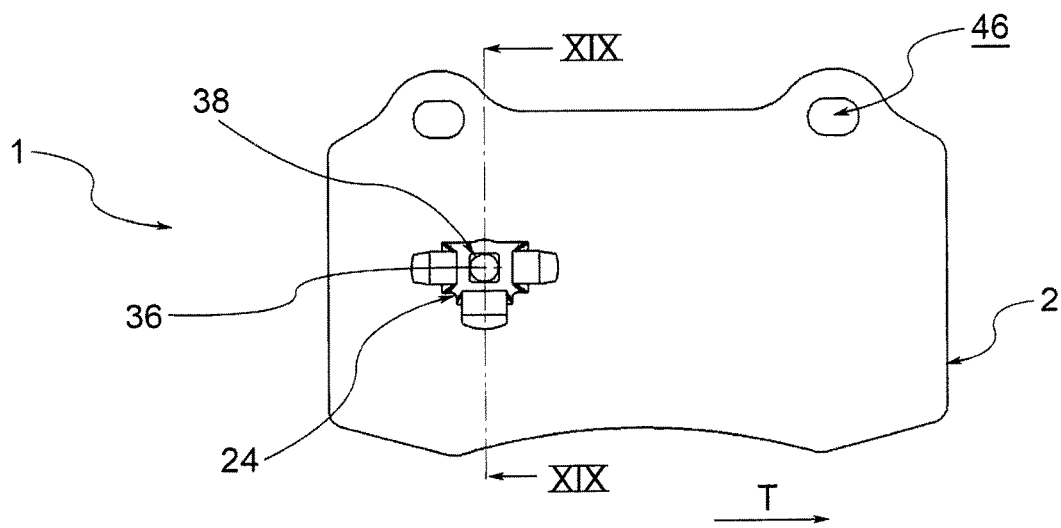
Figure 19:
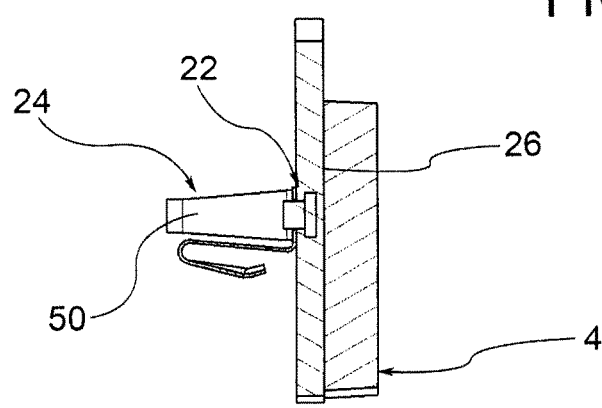
Figure 21:
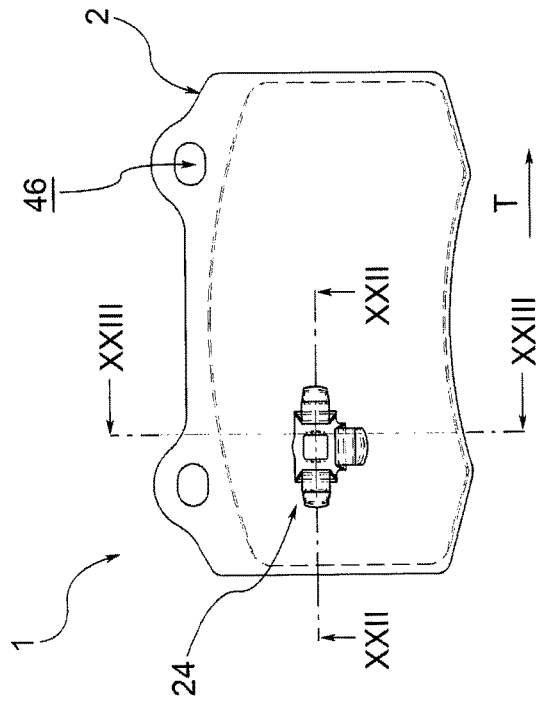
FIGS. 20, 21, 22 and 23 respectively illustrate a rear perspective view, a rear view and two sectional views along the planes XXII-XXII and XXIII-XXIII of FIG. 21 of a friction assembly, covered by this invention, according to an embodiment.
Figure 23:
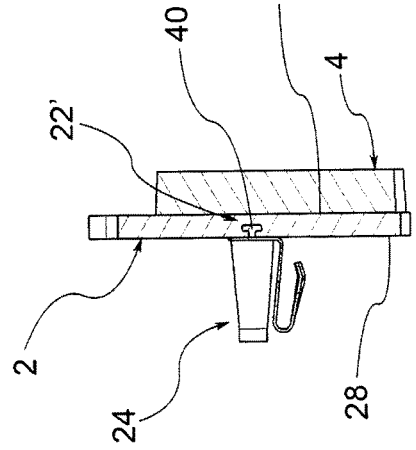
Figure 20:
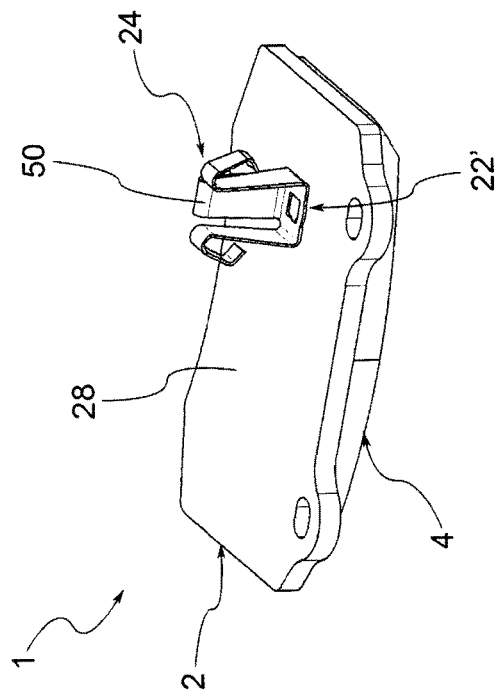
Figure 22:
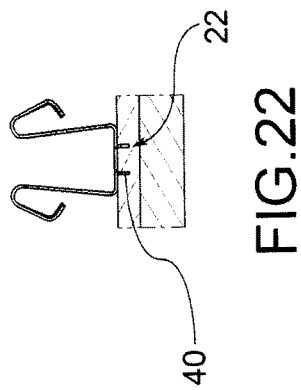
Figure 24:
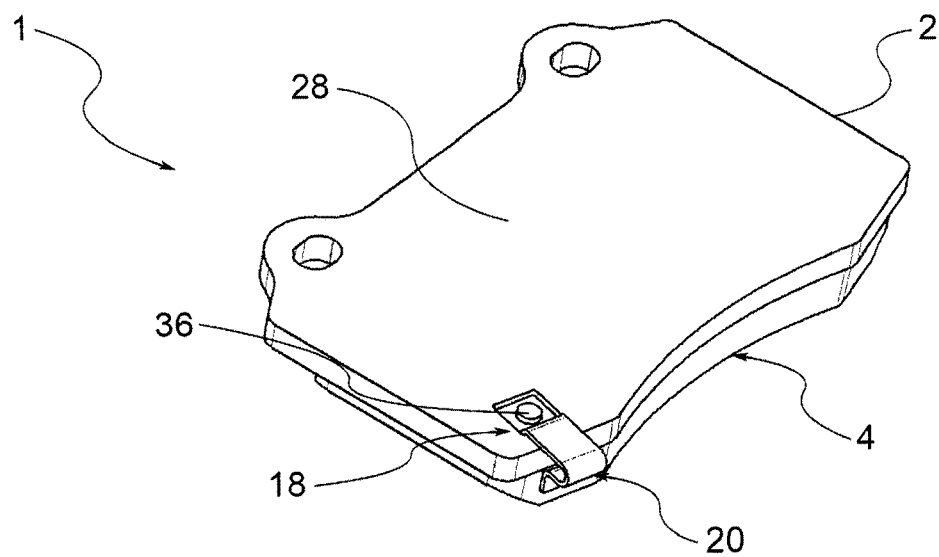
FIGS. 24, 25 and 26 respectively show a rear perspective view, a rear view and a sectional view along the plane XXVI-XXVI of FIG. 25 of a friction assembly, covered by this invention, according to another embodiment.
Figure 25:
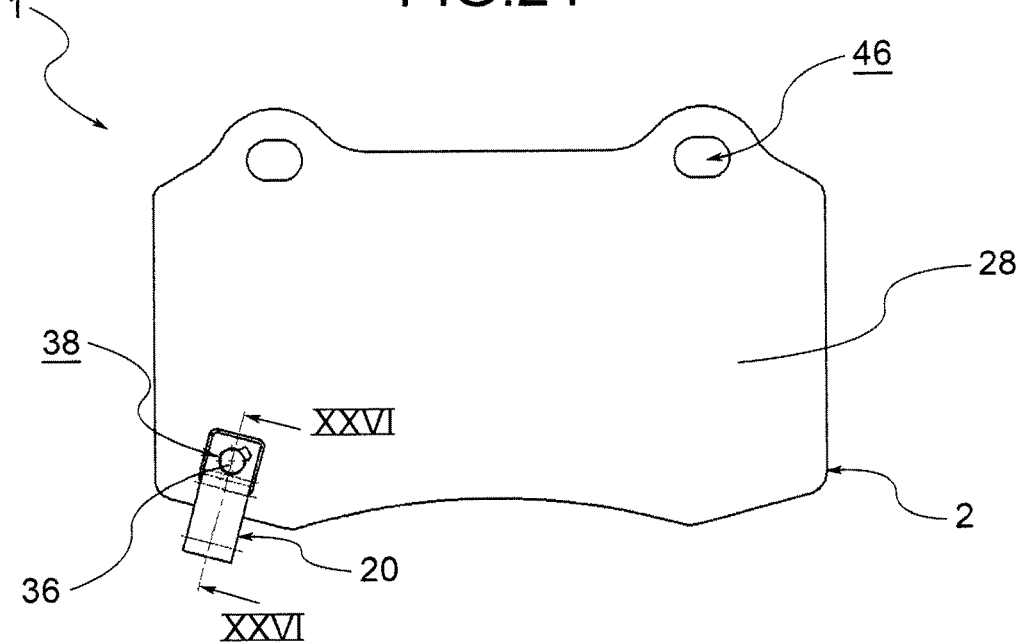
Figure 26:
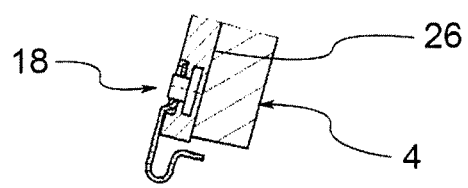
Figure 27:
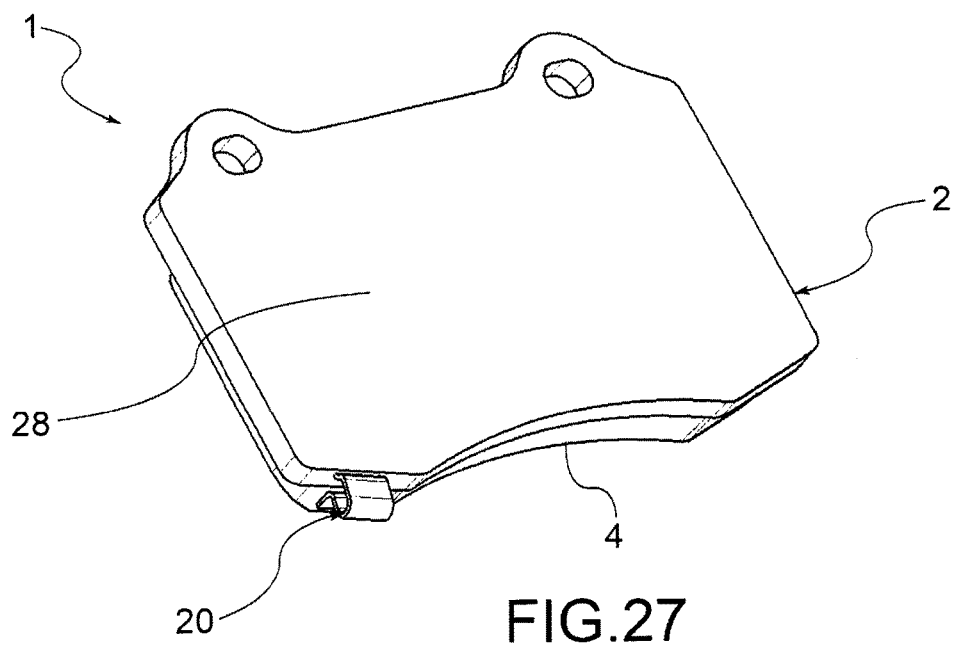
FIGS. 27, 28 and 29 respectively show a rear perspective view, a rear view and a sectional view along the plane XXIX-XXIX of FIG. 28 of a friction assembly, covered by this invention, according to a further embodiment.
Figure 28:
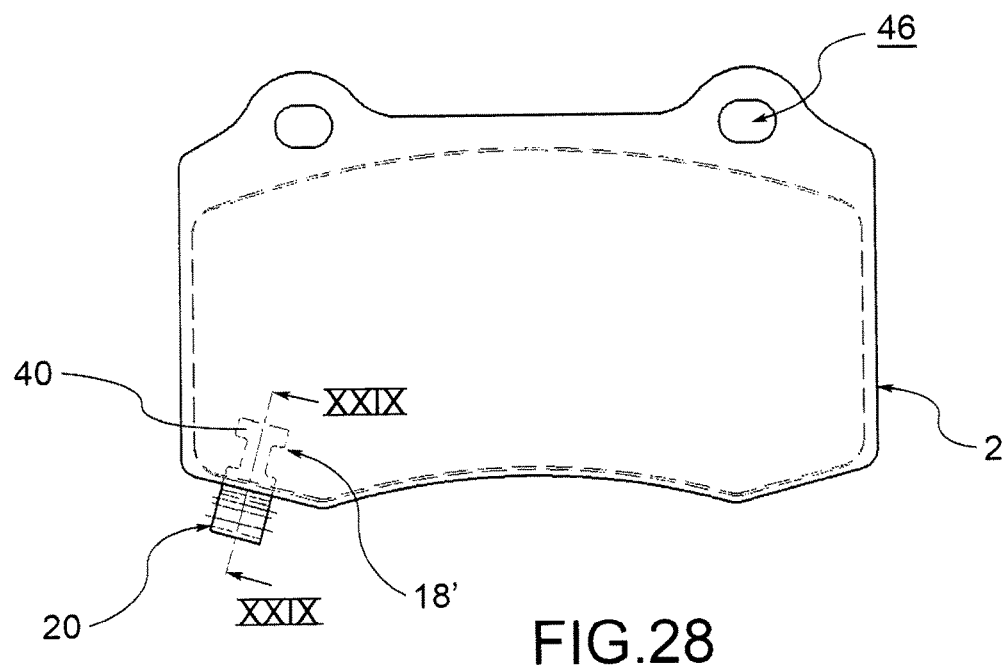
Figure 29:
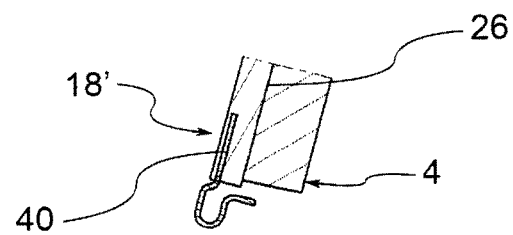

With reference to the variants of FIGS. 3 and 12, the separation zone 26 between the support plate 2 and the brake pad 4 is schematically shown as a precise division plane between these components. However, this is a graphic representation since, in reality, the separation zone will be most probably an irregular plane or even a volume within which there will be an intimate admixture of heat-resistant resin with reinforcing fibres (due to the support plate), and heat-resistant resin—preferably devoid of such fibres, and optionally loaded with a friction modifying component—belonging to the brake pad.

According to the invention, the support plate 2 identifies one or more accessory-connection seats, made by co-moulding.

According to various embodiments, such one or more seats may be selected among:

i) at least one housing seat 6 for a vibration suppression body 8;

ii) at least one connection seat 10,10' for a frequencies reduction mass 12 in particular of the natural frequencies of the brake pad;

iii) at least one engagement, seat 14,14' of a rear spacer 16 (for example a shim) of the support plate 2;

iv) at least one connection seat 18,18' for a mechanical or electronic wear indicator 20 of said brake pad;

v) at least one junction seat 22, 22' for the anchor component 24 of the support plate 2 to a piston preferably hollow—of a disc brake calliper;

vi) at least one positioning seat 42, 42',42" for a temperature or force/torque sensor 44.

As mentioned, several variants of the invention may provide one or a plurality of combinations of these seats i)-vi), according to the contingent needs.

According to several variants, the seat i)-vi) could comprise a housing cavity and/or a retention prominence for the vibration suppression body 8, for the frequencies reduction mass 12, for the rear spacer 16, for the wear indicator 20, for the anchor component 24, for the temperature or force/torque sensor 44.

Or, according to further—embodiments, the housing cavity and/or retention prominence could be engaged by an intermediate support 30,48 of said suppression body, of said reduction mass, of said rear spacer, of said wear indicator, of said anchor component and/or of said temperature or force/torque sensor.

Preferably, the intermediate support 30, 48 could be at least partially incorporated in the heat-resistant resin of the support plate 2.

For example, the intermediate support 30, 48 could comprise or be constituted by a metallic element.

Figure 2:
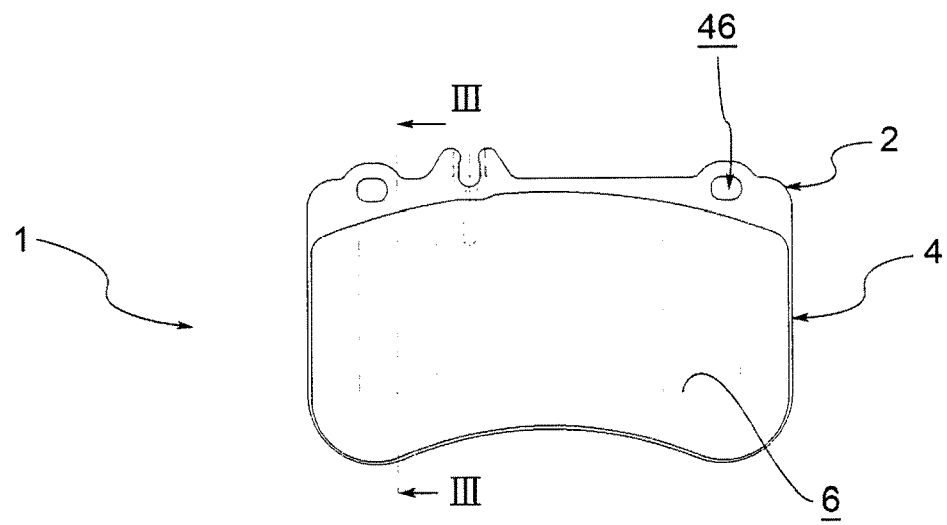

With reference, for example, to the embodiment shown in FIGS. 1-3, the housing seat 6 for the vibration suppression body 8 could be in the form of a closed housing cavity, completely delimited in the thickness of the support plate 2, within which cavity said body may be housed.

With regard to the function of this body 8, it can be used to prevent a symmetrical distribution of vibrations in the assembly 1 described.

Figure 5:
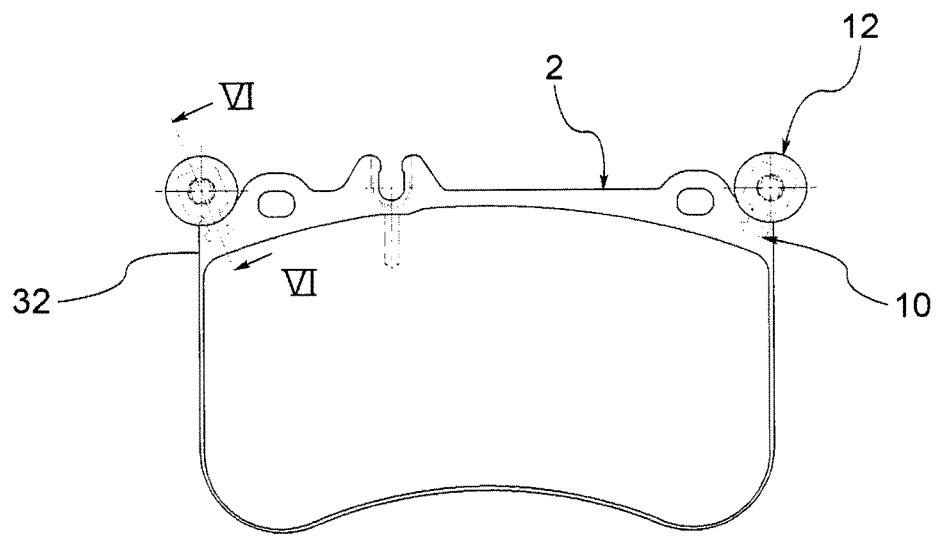
Figure 6:
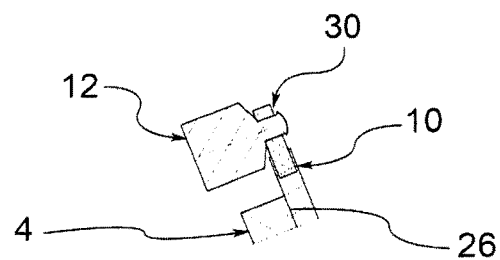
Figure 7:
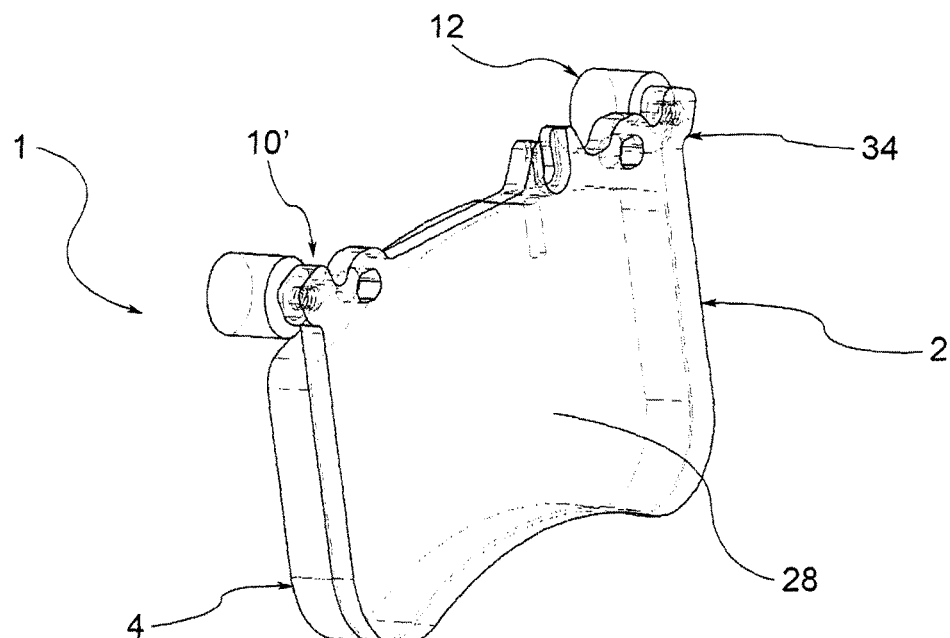
FIGS. 7, 8 and 9 respectively show a rear perspective view, a front view and a sectional view along the plane IX-IX of FIG. 8 of a friction assembly, covered by this invention, according to a further embodiment.
Figure 8:
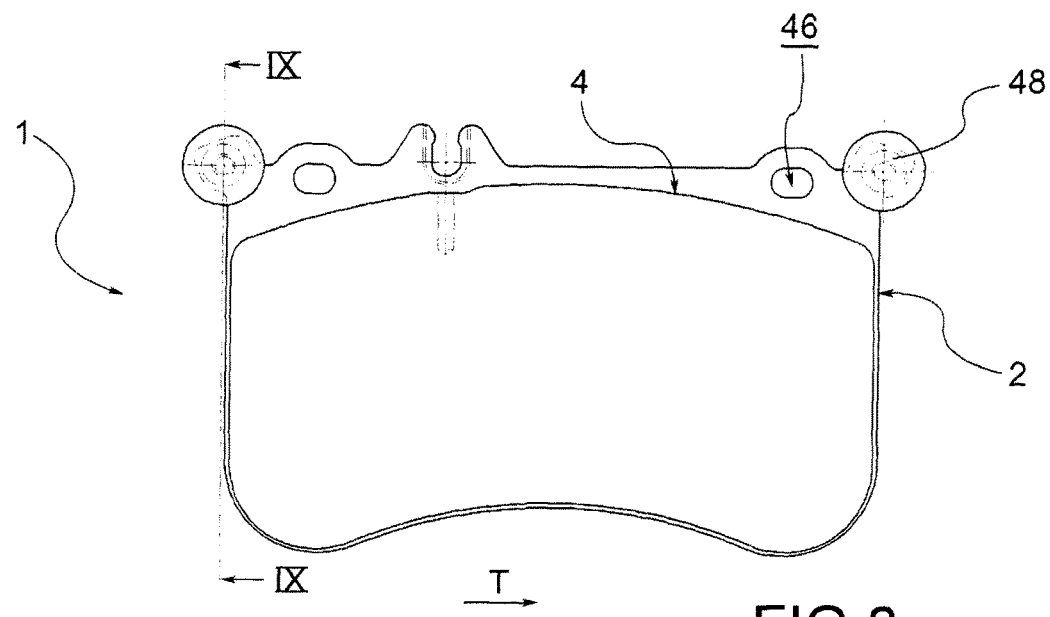

According to a further variant, for example schematically shown in FIG. 5, the assembly 1 could comprise an intermediate support 30 associated with the connection seat 10 for the frequencies reduction mass 12 of said pad.

In other words, the intermediate support 30 is preferably connected, on one side, to the support plate in correspondence with the mentioned seat, and is connectable, at another end, to said mass.

In relation to the function of such one or more masses, they act to reduce the natural frequencies of the brake pad 4, and therefore the noise of the pads, since they concentrate an important mass to the top of the plate, in particular at or above the holes 46.

According to an embodiment, the connection seat 10 could comprise an open housing cavity in correspondence of a perimetral zone 32 of the support plate 2, for example in a manner projecting from the thickness of the plate, so that the intermediate support protrudes in part externally to the aforesaid cavity.

For example, one end of the intermediate support 30 could be shaped in an anti-detachment manner—for example in a T-shape—by the heat-resistant resin of the plate 2.

According to a variant, the connection seat 10' for the frequencies reduction mass 12 could comprise at least one appendage 34 protruding from the support plate 2, preferably made in one piece in heat-resistant resin, to which said mass may be anchored.

Figure 9:
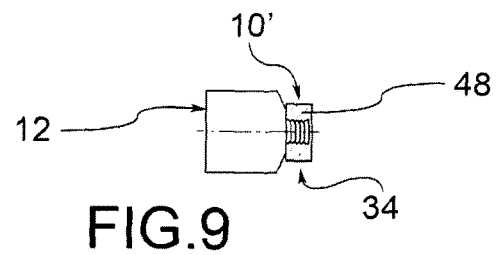
Figure 10:
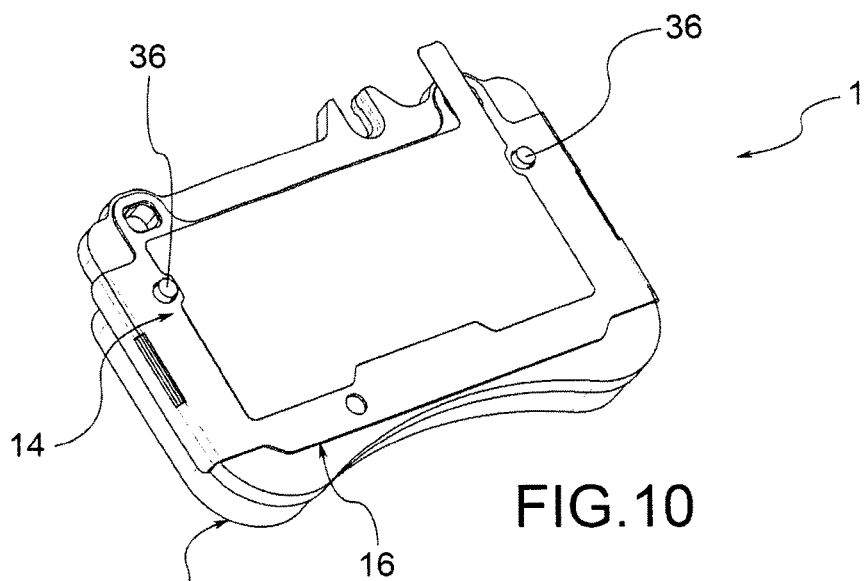
FIGS. 10, 11 and 12 respectively show a rear perspective view, a rear view and a sectional view along the plane XII-XII of FIG. 11 of a friction assembly, covered by this invention, according to a variant.
Figure 11:
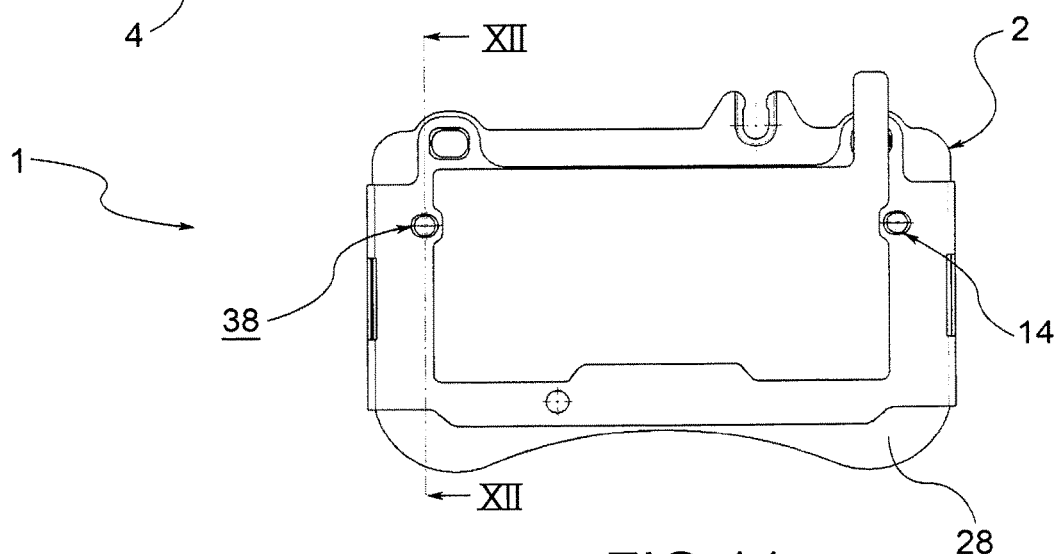

According to the variant shown schematically in FIG. 9, the frequencies reduction mass 12 could be connected or screwed to an intermediate support 48, advantageously threaded in a complementary manner to the mass.

According to an advantageous embodiment, at least one out of the engagement seat 14,14' of the rear spacer 16, the connection seat 18,18' for the wear indicator 20, and/or the junction seat 22, 22' for the anchor component 24 comprises one or more retention protuberances 36 suitable for being inserted in one or more compartments 38, for example from side to side, of said rear spacer 16, of said wear indicator 20 and/or said anchor component 24.

Preferably, according to these variants, the retention prominence 36 could serve as the intermediate support, and could be made of a material different from the heat-resistant resin.

For example, the retention prominence 36 could be at least partially incorporated in the heat-resistant resin of the support plate 2.

Preferably, the retention prominence 36 could comprise or be constituted by a metallic element.

Preferably the friction assembly 1 further comprises one of more out of the vibration suppression body 8, the frequencies reduction mass 12, the rear spacer 16, the wear indicator 20, the anchor component 24 and/or the temperature or force/torque sensor mechanically connected to one or more respective seat i)-vi).

According to further embodiments, at least one out of the rear spacer 16, the wear indicator 20 and/or the anchor component 24 comprises at least one portion 40 projecting into the accessory connection seat or housing cavity. Said portion 40 could be formed in one piece with the rear spacer 16, with the wear indicator 20 and/or with the anchor component 24.

Advantageously, the projecting portion 40 could be partially incorporated in the heat-resistant resin of the support plate 2.

With regard to the variants shown in FIGS. 30-35, the assembly 1 could comprise a single positioning seat 42' (and thus a single sensor 44) disposed along a side edge 52 of the support plate, two distinct seats 42 separated along the side edge, or a pair of separate seats 42" arranged in a space between the support plate 2 and the brake pad assembly 4 inside the friction assembly 1 (i.e., in a position different from an edge position).

Figure 32:
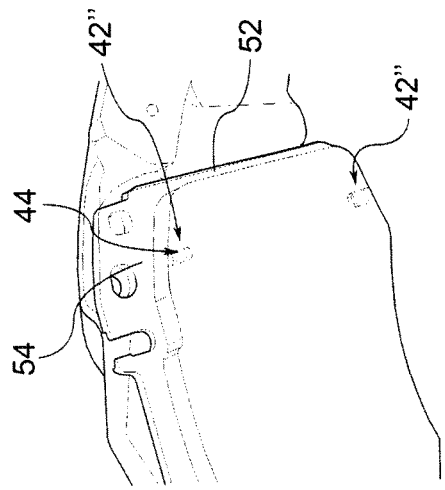
FIGS. 30, 31 and 32 schematically show the possible positions of sensors in a support plate.
Figure 35:
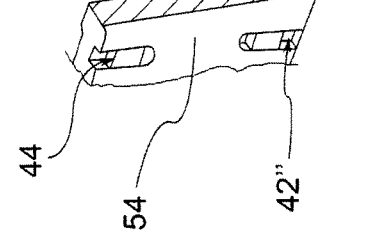
FIGS. 33, 34 and 35 show two side views and a sectional view of the assemblies illustrated respectively in FIGS. 30, 31 and 32.
Figure 31:
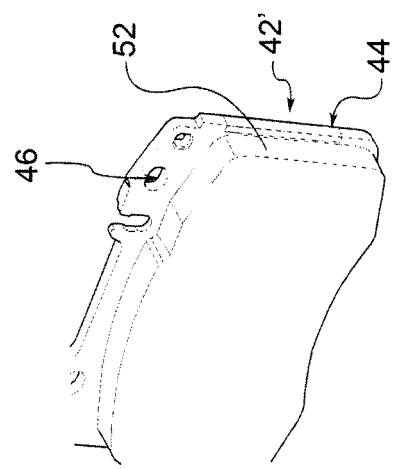
Figure 34:
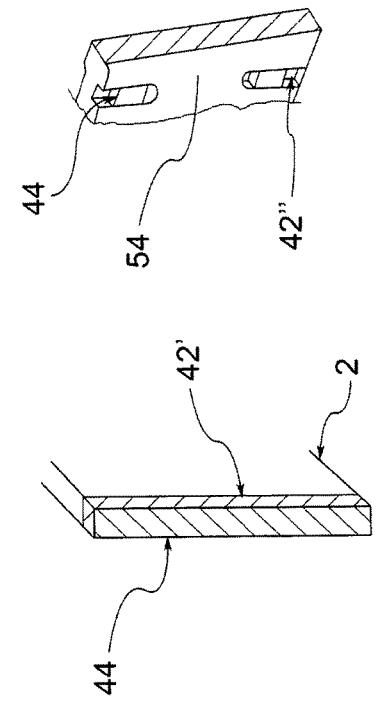
Figure 30:
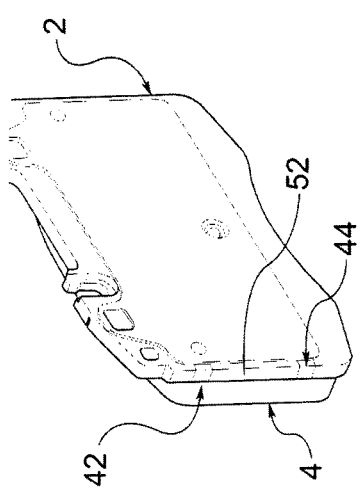
Figure 33:
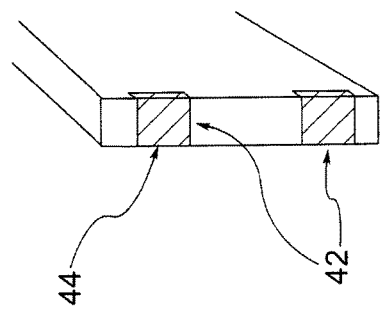

The latter variant is schematically shown in FIG. 32 via the hatching of the seats and the sensor and, in FIG. 35, through the indication of the front surface 54 of the support plate 2.

Optionally, the sensor indicated by reference number 44 could be an electronic wear indicator of the brake pad.

In addition, this invention also relates to a method of manufacturing a friction assembly.

Since a preferred embodiment of the method provides for it to be used to produce a friction assembly 1 according to any of the preceding embodiments, preferred or advantageous variants of this method may include any step deducible—even only implicitly—from the preceding description of the assembly.

The method comprises:
  at least one sub-step of co-moulding—preferably by compression—a support plate 2 from at least one heat-resistant resin partially loaded with reinforcement fibres, and at least one brake pad 4 in heat-resistant resin, for example devoid of, or comprising, said fibres; and
  at least one step of making one or more accessory-connection seats in the support plate 2, at least partially simultaneously with said sub-step of co-moulding.

Preferably, the one or more seats are selected from among the accessory-connection seats i)-vi) illustrated above.

Finally, this invention relates to a brake calliper comprising a friction assembly 1 according to any of the embodiments illustrated above, or an assembly manufactured according to the method discussed.

The purpose of this invention will now be illustrated on the basis of a non-limiting example.

Example: Co-Moulding the Friction Assembly

To co-mould the above-mentioned assembly, a hot press with modified mould is employed so as to delimit two adjacent or superimposed cavities: a first mould cavity is intended to receive the heat-resistant resin of the support plate while a second mould cavity will house the heat-resistant resin instead of the brake pad.

The mould is also provided with housings to arrange the elements for forming the accessory-connection seat, or the related plurality.

More precisely, the mould can receive the vibration suppression body, the frequencies reduction mass, the rear spacer, the wear indicator, the anchor component, the sensor, the intermediate support, and/or one or more retention prominences, as defined above.

In the first mould cavity will then be placed one or a plurality of the above elements, after which the heat-resistant resin already loaded with the reinforcement fibres is evenly distributed to fill this cavity. In the second mould cavity will be disposed a similar or a different heat-resistant resin, optionally in the presence of at least one friction modifying component.

The moulding temperatures can vary between 130° C. and 180° C. depending on the resins used, while the operating pressures can be in the range 10-50 MPa. Based on the size of the pad and the amount of resins used, the moulding times range from one to about ten minutes, often being of 2-5 minutes.

After moulding the friction assembly, it is placed in an oven at a temperature of about 220° C. to complete the crosslinking of the resin(s).

Innovatively, the assembly, calliper and the method described allow achieving the defined goals.

Advantageously, the assembly and calliper covered by this invention are simple to build and thus producible at low cost and with repetitive and automatable tasks.

Advantageously, the assembly, calliper and method covered by this invention have geometrical couplings that allow a substantial self-positioning.

Advantageously, the assembly covered by this invention is extremely durable and reliable, even under the most drastic conditions of use.

Advantageously, by virtue of the techniques described, this assembly provides reliable operation in a wide range of temperatures, without suffering damage or lacerations, for example between the plate and the brake pad.

Advantageously, the assembly covered by this invention has a low thermal conductivity, due to which there is a low probability of vapour lock of the brake calliper.

Advantageously, although long reinforcement fibres are much more difficult to form in the heat-resistant resin, they provide unexpected mechanical performance.

To the embodiments of the above assembly, brake calliper and method, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realized independently of the other variants described.

The invention claimed is:

1. A friction assembly comprising a co-moulded support plate and at least one brake pad, the co-moulded support plate and brake pad made of at least one heat-resistant resin, the support plate further comprising non-metallic reinforcement fibres within the at least one heat-resistant resin;
   wherein the support plate further comprises one or more accessory-connection seats co-moulded in the support plate, selected from:
   i) at least one housing seat for a vibration suppression body;
   ii) at least one connection seat for a frequencies reduction mass of said brake pad;
   iii) at least one engagement seat of a rear spacer of said support plate;
   iv) at least one connection seat for a mechanical or electronic wear indicator of said brake pad;
   v) at least one junction seat for an anchor component of the support plate to a hollow piston of a disc brake calliper; and
   vi) at least one positioning seat for a temperature or force/torque sensor.

2. The friction assembly according to claim 1, comprising a vibration suppression body, a frequencies reduction mass, a rear spacer, a wear indicator, a anchor component and/or a temperature or force/torque sensor mechanically connected respectively to the one or more accessory-connection seat.

3. The friction assembly according to claim 2, wherein at least one out of the rear spacer, the wear indicator and/or the anchor component comprise at least one portion projecting into the accessory connection seat, said projecting portion being partially embedded in the heat-resistant resin of the support plate.

4. The friction assembly according to claim 1, wherein the brake pad further comprises at least one friction modifying component added in a percentage by weight related to the percentage by weight of the reinforcement fibres in the support plate, configured such that a thermal shrinkage and/or expansion of the support plate and of the brake pad are substantially similar.

5. The friction assembly according to claim 4, wherein the at least one friction modifying component is also present in the heat-resistant resin of the support plate, at least at a separation zone with the brake pad.

6. The friction assembly according to claim 1, wherein the reinforcement fibres are a mean length equal to or greater than approximately 12 millimeters configured to increase mechanical resistance of the said support plate.

7. The friction assembly according to claim 1, wherein the reinforcement fibres are oriented prevalently or exclusively along a stress direction of said brake pad, in a configuration of use of said friction assembly in a disc brake calliper.

8. The friction assembly according to claim 1, wherein the at least one heat-resistant resin comprises a phenolic resin.

9. The friction assembly according to claim 1, wherein the support plate further comprises a reinforcement mesh or plate, at least partially inserted within a thickness of the support plate to create a rear surface of said plate that is substantially planar.

10. The friction assembly according to claim 1, wherein the one or more accessory-connection seats further comprise a housing cavity and/or a retention prominence configured to receive within the one or more accessory-connection seats respectively the vibration suppression body, the frequencies reduction mass, the rear spacer, the wear indicator, the anchor component, the temperature or force/torque sensor, or engaged by an intermediate support of said vibration suppression body, said frequencies reduction mass, said rear spacer, said wear indicator, said anchor component and/or said temperature or force/torque sensor.

11. The friction assembly according to claim 1, wherein the housing seat for the vibration suppression body is a closed housing cavity, formed completely within a thickness of the support plate, wherein said vibration suppression body is housed within the closed housing cavity.

12. The friction assembly according to claim 1, wherein the connection seat for the frequencies reduction mass of said brake pad further comprises an intermediate support, said connection seat comprising a housing cavity open at a perimetral zone of the support plate, so that said intermediate support partly protrudes outside said housing cavity.

13. The friction assembly according to claim 1, wherein the connection seat for the frequencies reduction mass comprises at least one appendage protruding from the support plate, made in one piece in a heat-resistant resin, to which said frequencies reduction mass is anchored.

14. The friction assembly according to claim 1, wherein at least one of: the engagement seat of the rear spacer, the connection seat for the wear indicator, and the junction seat for the anchor component comprises one or more retention protuberances suitable for being inserted in one or more compartments of said rear spacer, of said wear indicator and/or said anchor component.

15. The friction assembly according to claim 1, wherein the reinforcement fibres are selected from the group consisting of carbon fibres, glass fibres, boron fibres, silica fibres, silicon carbide fibres, ceramic fibres and mixtures thereof.

16. A method of making a friction assembly according to claim 1, comprising:

at least one sub-step of co-moulding a support plate from at least one heat-resistant resin partially loaded with reinforcement fibres, and at least one brake pad in heat-resistant resin;

at least one step of making one or more connection-accessory seats in the support plate, at least partially simultaneously with said sub-step of co-moulding, said one or more seats being selected from:

i) at least one housing seat for a vibration suppression body;

ii) at least one connection seat for a frequencies reduction mass of said brake pad;

iii) at least one engagement seat of a rear spacer of said support plate;

iv) at least one connection seat for a mechanical or electronic wear indicator of said brake pad;

v) at least one junction seat for an anchor component of the support plate to a hollow piston of a disc brake calliper; and vi) at least one positioning seat for a temperature or force/torque sensor.

17. A brake calliper comprising the friction assembly according to claim 1, or an assembly made according to the method of making a friction assembly according to claim 16.

18. The method according to claim 16, comprising a step of providing the heat-resistant resin comprising a step of providing a phenolic resin by means of a reaction between an optionally substituted phenol and formaldehyde in a presence of hexamethylenetetramine.

19. The method according to claim 16, wherein said sub-step comprises a step of moulding one or more heat-resistant resins for compression.

20. The method according to claim 16, comprising a step of rectifying at least a rear surface of the support plate to be substantially planar.

* * * * *